United States Patent [19]

Shinozawa et al.

[11] Patent Number: 4,913,643
[45] Date of Patent: Apr. 3, 1990

[54] PLASTIC MOLDING MOLD FOR INMOLD LABELLING

[75] Inventors: Kiyotaka Shinozawa, Saitama; Tadashi Yamamoto, Tokyo, both of Japan

[73] Assignee: Pentel Kabushiki Kaisha, Japan

[21] Appl. No.: 251,509

[22] Filed: Sep. 29, 1988

[30] Foreign Application Priority Data

Sep. 29, 1987 [JP] Japan .................. 62-242833

[51] Int. Cl.⁴ ........................................... B29C 49/24
[52] U.S. Cl. ........................ 425/503; 264/509; 425/504
[58] Field of Search ............... 264/509; 425/503, 504

[56] References Cited

U.S. PATENT DOCUMENTS 3,657,405  4/1972  Langecker .................. 425/503
4,355,967  10/1982 Hellmer .................... 425/503
4,639,207  1/1987  Slat et al. ................. 425/504

Primary Examiner—Jay H. Woo
Assistant Examiner—Timothy W. Heitbrink
Attorney, Agent, or Firm—Bruce L. Adams; Van C. Wilks

[57] ABSTRACT

A plastic molding mold for inmold labelling including an inner surface defining a cavity and adhering a label placed prior to molding on the inner surface to an outer surface of an article to be molded simultaneously with molding. The mold having a label support portion protruded from the inner surface and having a surface slightly projected into the cavity, and an exhaust port opened in the side of the label support portion. The exhaust port is connected to an air suction device provided outside, and air stayed between an article to be molded and a label is removed as the air suction device is actuated.

12 Claims, 2 Drawing Sheets

PLASTIC MOLDING MOLD FOR INMOLD LABELLING

FIELD OF THE INVENTION

The present invention relates to a blow molding mold, and more particularly, to a plastic molding mold used for a so-called "Inmold Labelling" process in which a hollow article to be molded, such as a bottle, is molded and at the same time a label is applied to an outer surface of the article to be molded.

If, when a parison of a thermoplatic plastics in a soften semi-flowing state is expanded within a mold, a label is positioned in advance to an inner surface of the mold, a label can be applied to the outer surface of the article to be molded. In a case of blow molding, the temperature within the mold is less than 100° C., and therefore, a particular label rarely need to prepared. Labels used may be ordinary paper, metal, plastics or similar sheet-like material, and the inside thereof, that is, the surface in contact with the parison, is coated with an adhesive layer and a trademark, the goods or the like is printed on the surface.

One of technical tasks in this field is to improve the lowering of adhesion resulting from air trapped between an article to be molded and a label. For solving the aforesaid task, a label support portion within a mold corresponding to a labelling portion of an article to be molded is slightly projected into a cavity in a tableland fashion so that at the initial stage of molding, a parison and a label start to contact. In this case, if the parison first comes into contact with a central portion of the label and the contact position gradually spreads toward the outer peripheral portion of the label, air will not be trapped between the parison, i.e., a resulting article to be molded and the label. In a case where a labelling portion of an article to be molded is flat or has a shape having an extremely large curvature, such air trapping will not frequently occur. However, in a case where a labelling portion of an article to be molded has a shape having a small curvature, there is a tendency that the state of contact between the parison and the label moves from the outer peripheral portion toward the central portion, and therefore, air tends to be trapped in the central portion of the label.

SUMMARY OF THE INVENTION

It is an object of the present invention to provide a mold having an air-removing means between an article to be molded and a label in an inmold labelling system which can place a label in close contact with the outer surface of the article to be molded.

The present invention provides a plastic molding mold for inmold labelling including an inner surface which defines a cavity and adhering a label placed prior to molding on said inner surface to an outer surface of an article to be molded simultaneously with molding, the mold comprising a label support portion protruded in a tableland fashion from said inner surface and having a surface slightly projected into said cavity, an exhaust port opened to the side of said label support portion, an means for operatively connecting said exhaust port to an air suction means provided externally.

DESCRIPTION OF THE PREFERRED EMBODIMENTS

Figure 1:
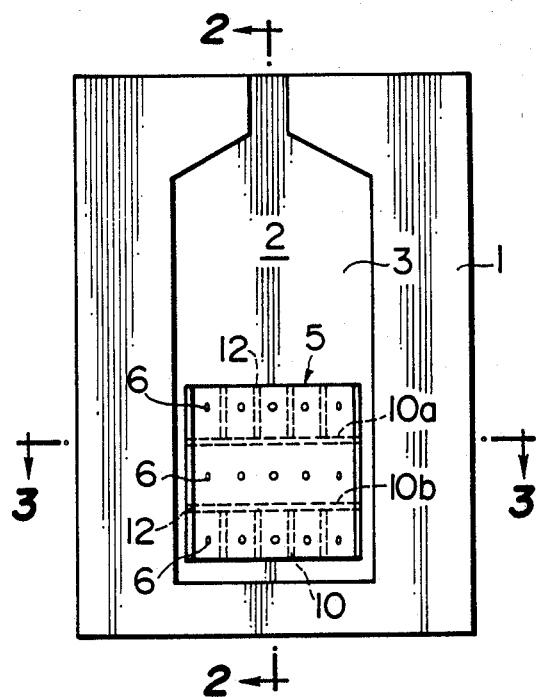
FIG. 1 is a side view showing a state in which a half of a mold according to the present invention is opened.
Figure 2:
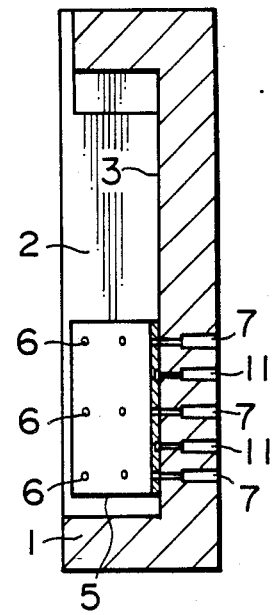
FIG. 2 is a sectional view taken along the line 2—2 of FIG. 1.

Referring to FIGS. 1 and 2, a mold according to the present invention comprises a pair of halves equally divided into two mold sections 1,1 similar to a well-known mold, each half having an inner surface 3 defining a cavity 2. As will be apparent from FIG. 3, in this embodiment, the cavity 2 molds an article 4, such as a bottle, having a circular section. A label support member 5 secured to the inner surface 3 of the mold and is arranged within the cavity 2. The label support member 5 is formed from a plate made of metal, for example, brass, and the label support member 5 is formed into an arc-like configuration to define an arcuate face having the same curvature as that of the inner surface 3 of the mold, the member 5 being tightly secured by welding or adhesives to the inner surface 3 of the mold. The label support member 5 is formed with a number of intake or suction ports 6, each port being communicated with a corresponding intake passage 7 provided in the mold 1. Each intake passage 7 is connected to a first air suction means not shown in the drawing, and a label 9 is attracted on the surface of the label support member 5 through the intake or suction ports 6 of the member 5 as the air suction means is actuated, whereby the label 9 is positioned within the cavity 2 prior to molding.

On the other hand, an open-ended slot means 10 is formed in the inside of the label support member 5, that is in a surface joined to the inner surface 3 of the mold, the slot means 10 being communicated with an exhaust passage 11 formed in the mold 1. The open-ended slot means 10 defines a plurality of exhaust or suction ports 12 in the peripheral side edge of the label support member 5. The exhaust passage 11 is connected to a second air suction means not shown in the drawing to suck air from each exhaust or suction port 12 opened to the side of the member 5 through the slot means 10 of the label support member 5 as the air suction means is actuated. The label support member 5 desirably has a plane shape corresponding to the label 9 used, in which case, the exhaust or suction ports 12 may be positioned in each peripheral side edge of the label support member 5. The essential function of the slot means 10 formed in the label support member 5 and the exhaust passages 11 formed in the mold 1 is to connect each exhaust or suction port 12 to the second air suction means, and accordingly, they can be in number single or can be divided into plural numbers. In the illustrated embodiment, the label support member 5 is formed with an upper slot group 10a and a lower slot group 10b, each slot group including one trunk portion and four branch portions to define the exhaust or suction ports 12 which are six in total formed by said portions. The upper and lower slot groups 10a and 10b are connected to the common second air suction means (not shown) through the corresponding exhaust passages 11.

The blow molding method is well known and therefore will not be described in detail. This method has some modes. A typical extrusion blow molding method will be described in which a pipe made of a thermoplastic in a semiflowing state is downwardly extruded, which is sandwiched between molds divided into two sections, the pipe is cut off to form a bottomed parison, after which air is blown into the parison to inflate and urge the parison against the inner surface of the mold to be cooled and solidified by the mold.

According to the present invention, prior to molding, the first air suction means is actuated to suck air from the intake or suction ports 6 formed in the label support member 5 within the mold 1 through the suction passages 7 of the mold 1 connected to the first air suction means. Then, the label 9 is introduced onto the surface of the label support member 5, and the label 9 is attracted by suction to a predetermined position. Thereafter, a well-known blow molding process will be accomplished. In a case where the present invention is carried out, the second air suction means is actuated prior to blowing air with respect to the parison to suck air within the cavity 2 from the exhaust or suction ports 12 of the slot means 10 formed in the label support member 5 through the exhaust passages 11 of the mold 1 connected to the second air suction means. As the parison expands, the parison comes into contact with the label 9, which is pressed against the label support member 5, then air which remains between the parison and the label escapes towards the exhaust or suction ports 12 opened to the side of the label support member 5 passing the peripheral edge of the label 9. In a case where the exhaust ports 12 are not provided in the side of the label support member 5, the air between the parison and the label 9 has no place to escape, and therefore, it remains as trapped air. However, if there is negative pressure in the exhaust or suction ports 12 as in the present invention, air can escape towards the exhaust ports 12. It is noted that since the exhaust ports 12 are opened substantially at right angles to the radial direction of the cavity 2, the exhaust ports 12 do not receive pressure due to the expansion of the parison, and thus no possible entry of the parison into the exhaust ports 12 occurs.

Figure 3:
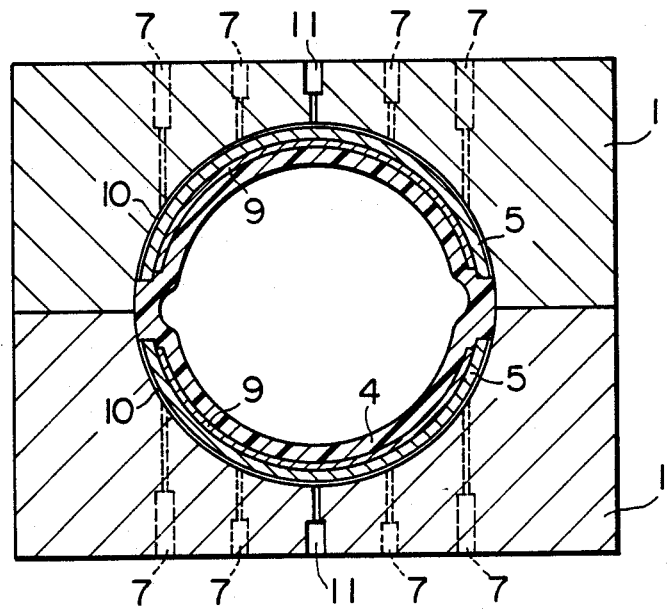
FIG. 3 is a sectional view taken at a position along the line 3—3 of FIG. 1 illustrating the in-use state of the mold shown in FIG. 1.
Figure 4:
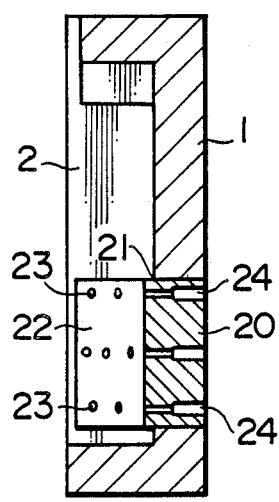
FIG. 4 is a sectional view similar to FIG. 2 showing a further embodiment according to the present invention which is somewhat different from the mold shown in FIG. 2.
Figure 6:
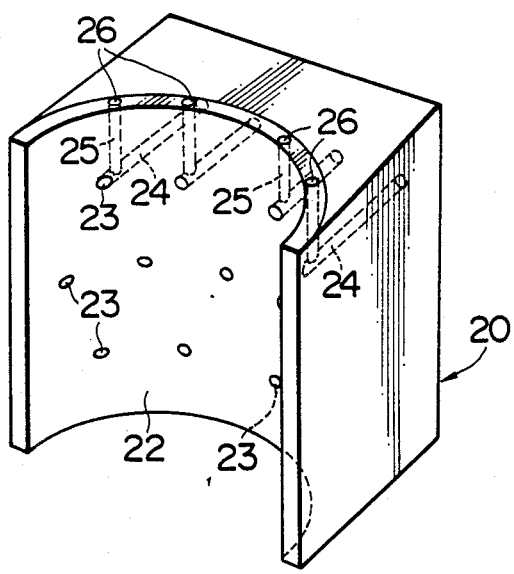
FIG. 6 is a perspective view of a label support block shown in FIG. 4.
Figure 5:
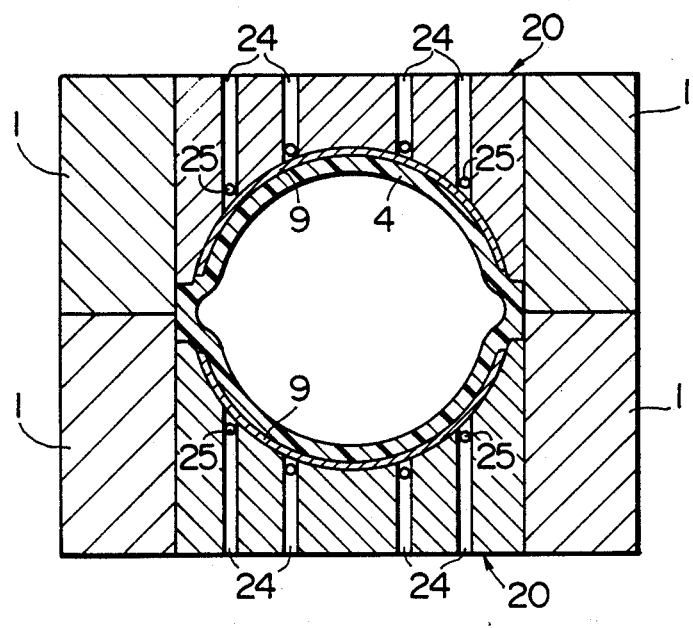
FIG. 5 is a sectional view similar to FIG. 3 illustrating the in-use state of the mold shown in FIG. 4.

Referring to FIGS. 4 and 5, a further embodiment according to the present invention, which is different from that shown in FIGS. 1 to 3, is illustrated. In the previously mentioned embodiment, the label support member 5 is formed from a metal plate having an arc-like section secured to the inner surface 3 of the mold 1, but according to this embodiment, a label support block or member 20 is mounted on the mold 1 from outside in a telescopic manner. That is, the mold 1 is formed with a mounting hole or opening 21, into which is fitted the label support block or member 20. The label support block 20 has an arcuate face 22 within the cavity 2, the arcuate face 22 being projected in a tableland fashion with respect to the inner surface 3 of the mold 1. The arcuate face 22 is formed with a number of intake or suction ports 23 opened in a radial direction of the cavity 2, the intake ports 23 being connected to an external common air suction means (not shown) through intake passages 24 corresponding thereto. In this case, there are formed exhaust passages 25 branched axially of the cavity 2 from some of the intake passages 24, the intake passages 25 being communicated with exhaust or suction ports 26 opened into the cavity 2 at the end of the label support block 20. While FIG. 6 illustrates four exhaust ports 26 formed at the upper end of the label support block 20, it is noted that exhaust ports similar thereto may be provided at the lower end of the label support block 20.

In this second embodiment, the intake passages 24 and exhaust passages 25 formed in the label support block or member 20 are connected to one another and to the common air suction means. This arrangement is somewhat different from the previous embodiment, but even if both the passages 24 and 25 are connected to the common air suction means, the operation is the same as the former.

While the preferred embodiments of the present invention have been described in detail, it is to be noted that the present invention is not limited to these embodiments but various modifications can be made. Accordingly, the scope of the present invention should be understood from the ensuing claims.

What is claimed is:

1. A mold for labelling a plastic hollow body produced by blow molding, said mold comprising:
   an inner surface having a curved portion and defining a cavity having a radial direction in which a parison of a thermoplastic material is inflated to form a plastic hollow body;
   a label support portion protruding from the inner surface into the cavity and having an arcuate face for supporting a label thereon, the arcuate face having a curvature substantially corresponding to the curvature of the inner surface and having a surface dimension not less than that of the label;
   a plurality of suction ports formed in the label support portion, the suction ports opening at a side edge of the label support portion in a direction substantially perpendicular to the radial direction of the cavity;
   a plurality of intake ports formed in the arcuate face of the label support portion and opening in the radial direction of the cavity; and
   communicating means for communicating the plurality of suction ports with air exhaust means located outside the mold to thereby exhaust air existing between the parison and the label and inner surface to the exterior of the mold and for communicating the plurality of intake ports with air exhaust means located outside the mold to thereby attract and closely hold the label on the arcuate face of the label support portion.

2. A mold according to claim 1; wherein the label support portion comprises an arcuate metal plate fixedly disposed on and along the inner surface and having the plurality of suction ports formed in the back surface thereof which faces the cavity inner surface; and the communicating means comprises a first set of air passages extending between the metal plate and the inner surface and through a side wall of the mold to communicate the suction ports with the air exhaust means and a second set of air passages formed through the metal plate and the side wall of the mold to communicate the intake ports with the air exhaust means.

3. A mold according to claim 1; wherein the mold has a hole formed through a side wall thereof, and the label support portion comprises a block telescopically immovably inserted into the hole so that the arcuate face thereof protrudes from the inner surface into the cavity; and the communicating means comprises a set of air passages formed in and through the block to communicate the suction ports and the intake ports with the air exhaust means.

4. An in-mold labelling mold for use in blow molding a hollow body while applying a label thereto during the blow molding, the mold comprising: a plurality of mold sections movable between open and closed positions, the mold sections having curved inner surfaces jointly defining a mold cavity when the mold sections are in the closed position; a label support member having a back surface, said label support member being mounted on at least one of the mold sections and immovably protruding from the mold section inner surface into the mold cavity during use of the mold, the label support member having an arcuate face for supporting a label thereon during use of the mold, the arcuate face lying within the mold cavity; means in the label support member defining first suction ports each of which open at one end at the arcuate face and which are connectable to a source of suction during use of the mold for holding the label by suction on the arcuate face; and means in the label support member defining second suction ports each of which open at one end at a surface portion of the label support member other than the arcuate face and which are connectable to a source of suction during use of the mold for exhausting by suction, air which exists between the hollow body and the label, and the hollow body and the mold cavity inner surfaces, as the hollow body expands during the blow molding.

5. An in-mold labelling mold according to claim 4; wherein the mold section on which the label support member is mounted has means therein defining first passages for connecting the first suction ports to the source of suction.

6. An in-mold labelling mold according to claim 5; wherein each of the first passages is connected to a respective one of the first suction ports.

7. An in-mold labelling mold according to claim 4; wherein the second suction ports are formed on the back surface of the label support member, said back surface facing the mold section inner surface.

8. An in-mold labelling mold according to claim 7; wherein the second suction ports open at a peripheral side edge portion of the label support member and face in a direction substantially perpendicular to the arcuate face.

9. An in-mold labelling mold according to claim 4; wherein the at least one mold section has an opening therein, the label support member being inserted into the opening such that the arcuate surface thereof protrudes into the mold cavity.

10. An in-mold labelling mold according to claim 9; including means defining passages within the interior of the label support member for interconnecting the first and second ports.

11. An in-mold labelling mold according to claim 9; wherein two of the mold sections contain openings therein, each mold section opening having inserted therein a similar label support member.

12. An in-mold labelling mold according to claim 9; wherein the one ends of the second suction ports open at a peripheral side edge portion of the label support member and face in a direction substantially perpendicular to the arcuate face.

* * * * *